No. 737,379. PATENTED AUG. 25, 1903.
W. FETZER.
DISCHARGE TUBE FOR GRAIN DRILLS.
APPLICATION FILED JUNE 22, 1903.
NO MODEL.
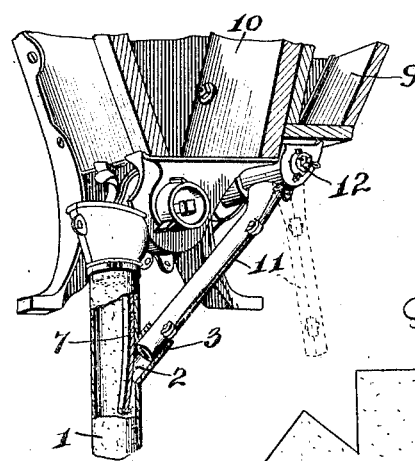
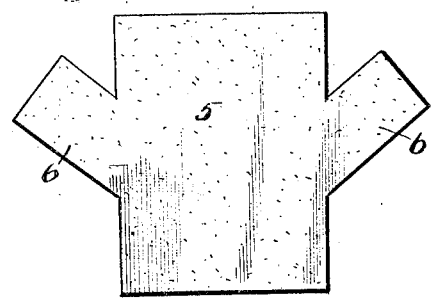
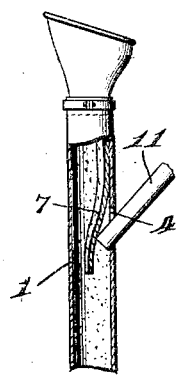
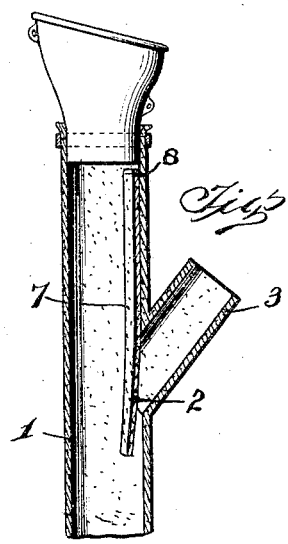
WITNESSES:
L. Gisford Handy
Cassell Severance
INVENTOR
William Fetzer,
BY
Mason, Fenwick Lawrence
Attorneys No. 737,379. Patented August 25, 1903.

UNITED STATES PATENT OFFICE.

WILLIAM FETZER, OF MIDDLETOWN, OHIO.

DISCHARGE-TUBE FOR GRAIN-DRILLS.

SPECIFICATION forming part of Letters Patent No. 737,379, dated August 25, 1903.

Application filed June 22, 1903. Serial No. 162,675. (No model.)

*To all whom it may concern:*

Be it known that I, WILLIAM FETZER, a citizen of the United States, residing at Middletown, in the county of Butler and State of Ohio, have invented certain new and useful Improvements in Discharge-Tubes for Grain-Drills; and I do hereby declare the following to be a full, clear, and exact description of the invention, such as will enable others skilled in the art to which it appertains to make and use the same.

This invention relates to improvements in discharge-tubes for grain-drills; and it consists in a discharge-tube provided with a lateral passage for receiving material to be discharged and a flap or inner piece for covering the said lateral opening.

This invention also consists in a discharge-tube mechanism for grain-drills comprising a main flexible tube having a laterally-branching tube extending therefrom for receiving seed from another source and means for covering the entrance of said lateral tube into the main tube.

It also consists in certain other novel constructions, combinations, and arrangements of parts, as will be hereinafter fully described and claimed.

In the accompanying drawings, Figure 1 is a perspective view, parts of which are broken away and shown in section, illustrating a canvas tube for drills having a lateral tube entering therein for receiving materials to be distributed from a different source from that supplying the main tube. Fig. 2 is an enlarged detail sectional view through the flexible seed-tube with its branch pipe. Fig. 3 is a similar view in section upon a smaller scale, showing the main seed-tube formed with a lateral opening for receiving a branch pipe. Fig. 4 is a plan view of a piece of flexible material cut to form the grain-tube with its branching inlet.

This invention is designed to make it possible to introduce into a flexible discharge-tube for grain-drills not only material at the upper end of said flexible tube, but also other material through the side thereof. In this manner fertilizer may be discharged through the main tube, while grass or other seed may be introduced at the side.

In carrying out the features of this invention I employ a main tube 1, preferably formed of flexible material, as canvas, the said main tubing being provided with a lateral inlet-opening, as at 2. The inlet may consist, if desired, of a branching tube, as 3, formed of the same material as the tube 1, or it may consist merely in an opening, as 4, in the walls of the main tube 1, through which another feed-tube may be introduced. When forming the attachment as shown in Figs. 1 and 2, I preferably construct the tubing of a piece of canvas or other material cut as shown in Fig. 4. The canvas thus formed consists of an approximately rectangular body portion 5, having laterally-approaching inclined portions 6. When these portions are rolled so that their edges are brought together, the body portion 5 is formed in the main tube 1, while the branching portions 6, which are secured together at their edges, form the branch tube 3, leading into the main tube, as clearly shown in Fig. 2. The main tube is secured at its upper end to the delivery portion of a seed-discharge cup, while the upper end of the branch tube 3 is left open, so that a tube from another portion of the seeder may be introduced therein, as illustrated in Fig. 1. In this manner seed, fertilizer, or other material may feed through the pipe 1, while seed or other material may be introduced into the same through the branching tube 2.

An important feature of the invention is means located within the main tube 1 for covering the inlet-opening at 2. This means preferably consists in a flap 7, constructed of flexible material, preferably canvas, and secured at its upper end, as at 8, to the wall of the tube 1 at a considerable distance within the branching inlet 2. The flap 7 covers the seed-inlet 2, extending a short distance below the same, so that material discharged through the pipe 1 cannot enter the opening 2 or become lodged or piled up at said opening. The flap 7 is only secured at its upper end, so that its lower end is free to move to one side and permit the entrance of materials introduced in the branch opening or tube 3.

As shown in Fig. 3, the branching tube may be dispensed with and a lateral opening only, as 4, used. A tube may be introduced into the opening 4 at any time for delivering material into the said tube 1 at the side thereof. In this case the flexible flap 7 will be moved a little to one side, as shown in Fig. 3, the said flap covering the end of the inserted tube, so as to prevent the gathering or clogging of materials thereon. When the branch tube is withdrawn from the opening 4, the flap 7 is in position to close the said opening and prevent any seed, fertilizer, or other material which may be discharged through tube 1 from passing out through said opening.

This device is especially well adapted for operation in connection with a grass-seed attachment or fertilizer distributer. In seeders of this kind there are usually separate compartments—as, for instance, 9—carried by the hopper 10 of the seeder. The hopper 9 is provided with a discharge-spout 11, which may be movably connected with the outlet of the hopper 9. The lower end of the tube 11 is inserted either in the branch tube 3 or in the opening 4, as the case may be. In this manner grass-seed may be discharged into the main pipe 1 and passed to the disks, shoes, or other furrow-openings at the lower end of the flexible tube 1.

The structure above described is particularly well adapted for providing a grass-seed attachment for canvas-topped grain or fertilizer tubes and is exceedingly simple in structure.

When it is desired to deliver the material into the main tube 1 from an auxiliary hopper, as 9, the discharge-tube 11 is inserted in the branch tube 3 or through the opening 4, so as to direct the material passing through said tube 11 into the tube 1. In this manner the seed or other material will be delivered to the disk-shoe, furrow-opener, or other device at the lower end of the flexible tube 1. It may be desired, however, to deliver the seed in front of or to the rear of the furrow-opener, in which case the tube 11 is removed from the branch tubing 3 or the opening 4 and is directed to a point in front of or to the rear of the flexible pipe or tube 1. This is especially applicable to seed-drills in which the auxiliary tube 11 is pivoted at the bottom of the hopper 9, as shown at 12 in Fig. 1. The tube 11 when inclined rearwardly occupies the position shown in Fig. 1; but when it is desired to deliver the seed in front of the furrow-opener the tube may be moved forwardly, as indicated in dotted lines in said Fig. 1. When the tube 11 is removed from the lateral opening of the canvas tube 1, the said lateral opening is automatically closed by the action of the flap 7.

When employing a branch flexible canvas-top discharge-tubing, it is not absolutely necessary that an inner flap be employed, for the branch tube being usually set at an angle to the main tube acts to some extent as a guard against the discharge of material through the lateral opening in the main tube.

Having thus fully described my invention, what I claim as new, and desire to secure by Letters Patent, is—

1. A discharge mechanism for drills comprising tubing formed with a main spout having a lateral inlet and means located within the tubing for covering the said inlet.

2. A discharge-tubing for drills comprising a main tube formed of flexible material and provided with a lateral inlet and a flap hung within the main tube for covering the inlet.

3. A discharge mechanism for grain-drills comprising a flexible tube for delivering material to the furrow-opener, said tube being provided with a branch inlet-tube and means for hanging in front of said branch tube upon the inside of the main tube for covering and protecting it.

4. A flexible tube for drill-delivery tubes comprising a main tube and a branch tube and a flap hanging within the main tube so as to overlie the inner end of the branch tube.

5. A grass-seed attachment for canvas-top tubes used upon grain-drills comprising a main tube formed of a blank of flexible material, said blank being cut with branching portions and fastened at the edges, the branching portions of the blank forming a branch tube leading into the main tube.

6. A discharge-tube for grain-drills comprising a canvas tube of flexible material formed with an opening in one side for receiving material through said side and a flap within the tube hanging over said opening to protect the inserted end of an auxiliary supply-tube and prevent material from clogging or hanging thereon.

7. A discharge-tube for grain-drills comprising a flexible portion and a branch inlet-tube projecting from said flexible portion to lead materials into the same through the side thereof.

8. A discharge-tube for grain-drills, comprising tubing having a lateral inlet.

9. A discharge-tube for grain-drills comprising flexible tubing having a lateral inlet.

In testimony whereof I hereunto affix my signature in presence of two witnesses.

WILLIAM FETZER.

Witnesses:
 G. R. BROOKS,
 M. F. RICHARDSON, Jr.